United States Patent [19]

Mehta

[11] 4,105,459

[45] Aug. 8, 1978

[54] SILICEOUS ASHES AND HYDRAULIC CEMENTS PREPARED THEREFROM

[75] Inventor: Povindar Kumar Mehta, El Cerrito, Calif.

[73] Assignee: The Regents of the University of California, Berkeley, Calif.

[21] Appl. No.: 640,893

[22] Filed: Dec. 15, 1975

Related U.S. Application Data

[60] Continuation of Ser. No. 437,068, Jan. 28, 1974, abandoned, which is a division of Ser. No. 276,133, Jul. 28, 1972, abandoned.

[51] Int. Cl.² .................................................. C04B 7/02
[52] U.S. Cl. ............................................ 106/98; 106/89
[58] Field of Search ........................... 106/89, 98, 120

[56] References Cited

U.S. PATENT DOCUMENTS

| | | | |
|---|---|---|---|
| 1,363,879 | 12/1920 | Junghandel | 106/98 |
| 2,062,879 | 12/1936 | Hammenecker | 106/120 |
| 2,410,954 | 11/1946 | Sharp | 106/98 |
| 2,469,379 | 5/1949 | Fraser | 106/120 |
| 2,720,462 | 10/1955 | Jones | 106/63 |
| 3,125,043 | 3/1964 | Gravel | 110/28 |
| 3,451,944 | 6/1969 | Finch | 252/421 |
| 3,574,816 | 4/1971 | Abbdellatif | 106/120 |

FOREIGN PATENT DOCUMENTS

| | | | |
|---|---|---|---|
| 2,070,383 | 9/1971 | France | 106/120 |

*Primary Examiner*—Winston A. Douglas
*Assistant Examiner*—John P. Sheehan
*Attorney, Agent, or Firm*—Julian J. Schamus

[57] ABSTRACT

Siliceous compositions are prepared from naturally occurring plant materials (particularly rice hulls and rice straw) which have relatively high silica concentration by controlled incineration of the plant material to preserve the original cellular structure of the material and to prevent formation of crystalline forms of silica so that the silica in the product (which may contain from about 49% to about 98% silica remains in the amorphous state; the novel silica containing compositions find utility as a constituent of novel hydraulic cement compositions of high strength and acid resistance, useful in the preparation of mortar and concrete.

1 Claim, 1 Drawing Figure

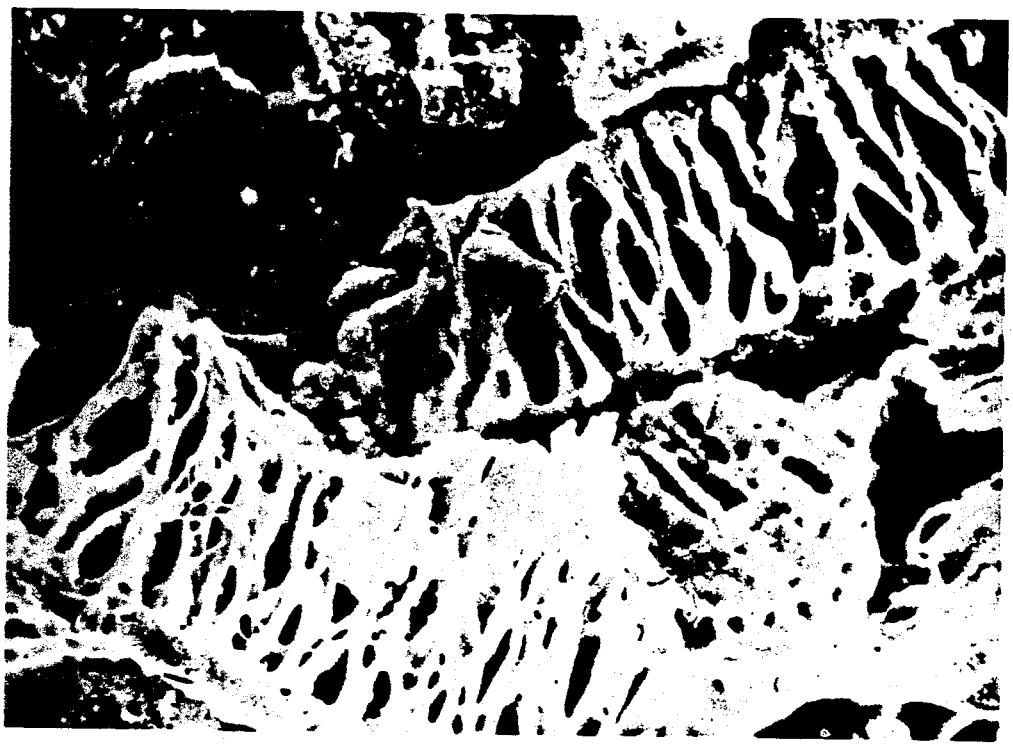
FIG. I

SILICEOUS ASHES AND HYDRAULIC CEMENTS PREPARED THEREFROM

This is a continuation of application Ser. No. 437,068, filed Jan. 28, 1974 which is a divisional of Ser. No. 276,133, filed July 28, 1972, both now abandoned.

BACKGROUND OF THE INVENTION AND PRIOR ART

This invention relates to a novel composition of matter comprising a highly reactive, highly amorphous, and anhydrous form of silicon oxide (silica); a method for its preparation and novel cement compositions prepared from such silica.

Certain agricultural organic materials are high in biogenetic silica, that is, silica occurring within the cell structure. Principally, rice hulls, rice stalks, equisetum, (a common weed popularly known as horsetails) and certain palm leaves, particularly palmyra palm, have varying amounts of silica in the cell structure. In addition, certain bamboo stems are known to contain relatively large amounts of silica and wheat straw contain from 2 to 3 percent silica in the cell structure. For example, most rice hulls are generally found to contain approximately 20% silica while rice straw may have approximately 18½% silica. Certain California horsetail weeds are known to have about 20 to 25% silica.

The disposition of rice hulls and rice straw has become a substantial problem to the rice growing industry inasmuch as they apparently can be disposed of only by burning or burying. Dump space for burying the material has become scarce in the last few years and the incineration of the silica bearing hulls and straw in open fields generally creates undesirable atmospheric pollutants.

It has been known, of course, that silica, along with calcium oxides, is a component of portland cement, primarily occurring as complex calcium silicates. However, the silica produced by the incineration of silica containing organic agricultural materials can be used as a cement component only to the extent that it replaces sand or shale, because the incineration of the hulls inevitably leads to the production of ash containing crystalline forms of silica.

The phase diagram of silicon dioxide indicates that a transition from the amorphous, non-crystalline form of material to the crystalline forms known as tridymite and crystobalite takes place at very high temperatures when the silica is in pure state. Thus, with pure silica in the amorphous form, it is theoretically necessary to raise the temperatures above 2,000° F to effectuate the transformation. However, the incineration of rice hulls, even at temperatures substantially below 2,000° F, has always lead to the formation of crystalline varieties of silica, because the transition temperature from amorphous to crystalline is reduced substantially by the presence of other components of the original rice hulls.

Prior attempts to use crystalline silica as an active component of portland cement have always involved heat treating mixtures of limestone and siliceous shales or clays at temperatures in excess of 2600° F. The same objective can also be accomplished by application of mechanical energy. Experimentally, it has been shown that attrition grinding of crystalline quartz can activate the silica by rupturing the chemical bonds at the surface. In addition to attrition grinding, vibromilled sand-lime mixtures which are attrition ground, have been reported to have acquired binding properties, and thus treated lime-sand mixtures have been used as hydraulic cements.

These processes, except for the commercial process of heating a siliceous raw material with limestone, appear to be commercially unattractive because of the excessive mechanical energy necessary in the vibromilling and attrition grinding processes.

OBJECTS OF THE INVENTION

It is an object of this invention to provide a novel amorphous silica material prepared from a silica containing organic agricultural product.

It is another object of this invention to provide a highly reactive form of silicon oxide.

It is a further object of this invention to provide a process for the disposition of organic agricultural waste materials having a relatively high initial silica content.

It is another object of this invention to provide novel hydraulic cement compositions.

It is another object of this invention to provide hydraulic cement compositions prepared from amorphous silica derived from organic waste, which cement can have high strength, acid resistant characteristics, and can range from white to black in color.

BRIEF DESCRIPTION OF THE DRAWINGS

In the drawings accompanying this application,

FIG. 1 is an enlargement of an electron microscope photomicrograph of the novel silica material of this invention.

DESCRIPTION OF THE INVENTION

The above and other objects of this invention are in part accomplished by providing as a new composition of matter, a highly reactive, highly amorphous, anhydrous material derived from organic agricultural matter, which agricultural matter has a high initial silica content of up to about 28%, which new composition comprises from about 49% to about 98% silica, the balance being mainly residual carbon and non-volatile inorganic constituents of the organic plant material. The residual carbon is generally removable upon extended heating to give a composition containing from about 0.3 to no more than about 2% residual carbon (as determined by loss on ignition) and from about 1 to about 5% of minor non-volatile impurities, other than CaO.

A preferred embodiment of the invention comprises the above composition wherein the silica content of the material is from 75 to about 98%. It is to be pointed out that the novel silica composition of this invention is characterized in that it retains the basic cellular structure outline of the organic material from which it is derived, and generally is characterized by a high surface area of in excess of 10 square meters per gram. In one embodiment of the invention, it is believed that a novel silica composition of this invention, after its initial preparation, contains about 2% carbon (as determined by loss on ignition tests) which is apparently trapped within the amorphous silica structure of the material or completely coated with amorphous silica so that its removal by thermal processes is difficult, if not impossible, without further physical treatment.

As noted above, the novel silica composition of this invention often contains minor impurities which are primarily the non-volatile inorganic residue of the organic material from which it is prepared. Principally, it has been found that in addition to very small quantitites of $Al_2O_3$, $Fe_2O_3$, $Mn_2O_3$ and some trace elements present in all natural organic materials, the siliceous material of this invention may contain from about 1 to about 2% potassium oxide ($K_2O$), up to about 1.5% $SO_3$, and $Ne_2O$ as well as CaO may be present.

Due to the mode of preparation of the materials, it is generally completely anhydrous and retains an outline of the basic cellular structure of the organic material from which it is derived. Depending upon the temperatures to which it is subjected, the material can be produced with surface areas in excess of 10 square meters per gram, and often in excess of 100 square meters per gram.

Still other objects of this invention are accomplished by a process for the incineration of organic agricultural material having an initial silica content of up to about 28%, which process comprises heating the silica containing organic material at temperatures not in excess of about 1250° F for periods up to about 66 hours. In practice, it is sometimes desirable to first heat the silica containing materials such as rice hulls to about 400° F at which temperature carbonaceous gas is evolved in the form of dense odoferous fumes accompanied by an exothermic reaction which gradually causes the temperatures to rise to approximately 900° F. Elevation of the temperature after completion of the exothermic reaction in an oxidizing atmosphere, for periods up to about 66 hours depending on the temperature, can lead to a product which is still highly amorphous and yet contains only minor quantities of residual carbon.

Yet other objects of this invention are accomplished by a novel hydraulic cement composition of this invention comprising from 5 to 50% by weight of quick lime or hydrated lime, and from 90 to 50% by weight of the novel silica of this invention.

Another aspect of this invention is an improved hydraulic cement which comprises, in anhydrous form, from about 5 to about 50% by weight of a portland cement, and from about 50 to about 95% by weight of silica in the form of the novel silica material of this invention.

The portland cement referred to is any portland cement having from about 60 to about 69% by weight of combined and uncombined calcium oxide.

A preferred embodiment of this aspect of the invention comprises a hydraulic cement having from about 20 to about 30% by weight of portland cement and from about 80 to about 70% of the novel silica composition described above. It has been found that excellent cements of high strength result from these compositions.

The various aspects of the present invention are more fully illustrated by reference to the following examples in which percentages are expressed by weight unless otherwise designated:

EXAMPLE I

A sample of rice hulls from the Sacramento, Calif., area (approximately 50 – 100 gr) were heated in an electric furnace. The sample was placed on the cool furnace and the temperature was gradually raised to about 300° F, at which temperature the sample began to turn dark brown. As the temperature was increased above 300° F, carbonaceous gases started to evolve and the fumes became quite dense and odorous at about 400° F. Without any increase in the electrical energy to the furnace, the sample temperature rose gradually to about 900° F, as monitored by a Chromel-Alumel thermocouple; indicating that the distillation or carbonization process was exothermic. When the temperature stabilized, samples of the material were withdrawn and subjected to further treatment and testing. The ash material withdrawn at this point was black, highly amorphous, had a very high specific surface and lost 45 – 50% of its weight upon ignition (carbonized matter).

EXAMPLE II

A small portion of the material from Example I (before conducting the loss on ignition test) was heated for 48 hours at temperatures ranging from 900° to 950° F. At the end of this time, the black ash had turned gray, but continued to exhibit a porous skeletal structure of high surface area and was highly amorphous.

EXAMPLE III

Another portion of the black material produced at about 900° F in Example I was heated for about 1 hour at between 1050° and 1100° F under oxidizing conditions. Again, the black ash turned gray, but retained the highly amorphous, high surface area character of the original black ash. Even after heating to about 1250° F, the gray ash retained its non-crystalline character. However, prolonged heating at above this temperature caused the material to convert (at least in part) first to the crystobalite and then the tridymite forms of crystalline silica.

Microscopic examination of the products of Examples I – III produced at 1250° F and below showed complete extinction under cross Nicols, indicating the complete absence of crystalline material. It also exhibited the porous skeletal structure of the silica of this invention as well as a very high surface area. The silica ash was also soft to the touch and disintegrated into fine particles on light grinding.

EXAMPLE IV

Portions of the amorphous silica ash of this invention prepared at 1250° F and below as in Examples I – III, were mixed at room temperature in a mortar and pestle with 20% by weight of quick lime (CaO). The reactivity of the silica was demonstrated by the fact that both chemical analysis and X-ray diffraction showed a complete reaction between the lime and the silica, a result which cannot be obtained with either naturally occurring silica, or rice hull ash prepared by existing processes of incineration.

EXAMPLES V – XIII

Individual quantities of rice hulls, rice straw and horsetail weed (Equisetum) crushed to pass through a ¼ inch mesh screen were individually treated in an electric furnace by heating to about 400° F to initiate the exothermic carbonization or distillation reaction described in Example I above.

After the exothermic reaction was essentially complete, samples were removed for analysis and testing. The balance was subject to an oxidizing atmosphere for ½ hour at 1000° F, at which time a second sample was removed and the balance of the material was heated in the oxidizing atmosphere for an additional 1½ hours at between 1050° – 1100° F.

In the following table (Table I), Examples V – VIII represent respectively the test results obtained from the rice hull incineration at the end of the exothermic reaction (Example V), after ½ hour at 1000° F (Example VI) and after 1½ additional hours at 1050° – 1100° F (Example VII). Similarly Examples VIII – X represent the three samples prepared by the same process from ground rice straw, while Examples XI - XIII are those prepared from horsetail weed.

Each sample was divided into small portions for determination of (1) total available silica, (2) loss on ignition, (3) surface area, (4) silica activity index, and (5) X-ray diffraction pattern.

Total available silica was determined by first determining loss on ignition, then leaching the carbon free sample with perchloric acid to dissolve all the remaining non-silica components and finally determining silica.

Loss on ignition was determined by heating a weighed portion of the material in a Pt. crucible at 1000° C in an oxidizing atmosphere for 1 hour, cooling and weighing and then reheating for 15 minutes and so forth until a constant weight was obtained upon cooling.

Surface area was determined by the standard B.E.T. nitrogen absorption method.

The "Silica activity index" is an indication of the reactivity of silica present in a material, and it is directly related to the degree of amorphousness of silica. This index has been developed to show the high degree of reactivity of the silica of this invention. The index is arrived at by experimentally determining the percentage of available silica which dissolves in an excess of boiling ½ N. NaOH in a 3-minute extraction in a stainless steel beaker on a −325 mesh sample.

When silica is truly amorphous, the characteristic X-ray diffraction peaks of crystalline forms of silica are absent. The degree of amorphousness, however, can be judged by the intensity or average height of the diffused band between 15° and 26° $2\theta$ using x-rays generated from a copper target with a nickel filter. Data reported in Table I in connection with relative X-ray diffraction intensity of the amorphous band is based on a full scale reading of 10 inches which represents 200 counts per second.

TABLE I

| Material | Total Available $SiO_2$% | Loss on Ignition% | Surface Area $M^2/g$ | Silica Activity Index | Relative Intensity of Amorphous Band by X-ray diffraction Counts/Second |
|---|---|---|---|---|---|
| Rice Hull Ash | | | | | |
| Ex.V | 50 | 49.4 | 122 | 85 | 74 |
| Ex.VI | 92 | 6.3 | 97 | 81 | 54 |
| Ex.VII | 93 | 4.5 | 76 | 79 | 54 |
| Rice Straw Ash | | | | | |
| Ex.VIII | 54 | 44.0 | 49 | 60 | 46 |
| Ex.IX | 85 | 12.0 | 22 | 61 | 40 |
| Ex.X | 90 | 5.2 | 11 | 43 | 40 |
| Horsetail Ash | | | | | |
| Ex.XI | 50 | 43.3 | 86 | 61 | 48 |
| Ex.XII | 75 | 12.8 | 81 | 63 | 32 |
| Ex.XIII | 77 | 9.8 | 74 | 58 | 30 |

The data in Table I indicate that all the materials are highly reactive forms of silica in the non-crystalline or amorphous state. Unlike the material produced from rice hull or rice straw, the silica ash produced from horsetail weed contains residual $CaCO_3$. As shown by the chemical analysis in Table II, this accounts for at least a part of the greater loss on ignition shown for the ash prepared from horsetail weed in Table I.

The analyses shown in Table II are representative of the materials produced from rice straw and Examples XI - XIII from horsetail weed.

TABLE II

| Material | Ash Content % of Unburned Plant Material | Analysis of Ash - % of Ash | | | | |
|---|---|---|---|---|---|---|
| | | $SiO_2$ | CaO | $K_2O$ | $Na_2O$ | Unanalyzed Residue ($Al_2O_3$ + $Fe_2O_3$ + $Mn_2O_3$) |
| Rice Hull Ash | 21.1 | 98.30 | — | 1.27 | 0.15 | 0.38 |
| Rice Straw Ash | 18.5 | 96.50 | — | 2.36 | 0.17 | 0.37 |
| Horsetail Weed Ash | 26.6 | 91.10 | 6.41 | 1.78 | 0.12 | 0.47 |

EXAMPLE XIV

A large quantity of the amorphous silica composition of this invention was prepared from Sacramento, Calif., area rice hulls in an inverted refractory furnace having tangential inlet means at the bottom for an airborne stream of rice hulls, means for initiating the exothermic reaction mentioned above and means for rapidly heating the ash and removing it from the bottom central portion of the cylindrical furnace. This furnace and the process by which it operates to prepare silica compositions within the scope of this present invention are disclosed and claimed in a companion patent application by Norman Pitt to be filed contemporaneously with this application and the serial number and filing date of that application will be inserted by amendment when known. The material produced for this example was amorphous, and showed from 12 to 14% loss of organic residue upon ignition (essentially unburned carbon); had an indicated surface area of 25.5 square meters per gram, a "Silica activity index" of 53 and was black in color.

EXAMPLE XV

The process of Example XIV was repeated using, however, a large quantity of Arkansas rice hulls in place of Sacramento, Calif., are a rice hulls. The product had 8.4% carbon, was grayish black and the chemical composition of the loss on ignition free product was similar to the ash prepared from the Sacramento, Calif., material and, as indicated below, was used to prepare a modified portland cement of exceptional strength characteristics.

EXAMPLES XVI - XIX

Portions of the amorphous silica ash from Examples XIV and XV were ground individually for 2 hours, in a ball mill with quick lime and different brands of ASTM Type III portland cements. In each case, a black or gray powder resulted, which upon mixing with water showed excellent hydraulic properties. To illustrate these properties, rice hull ash cement was prepared and cured in accordance with the standard ASTM mortar cube test method ASTM C109-70T and compressive strengths were determined. In all of the tests, the standard amount of Ottawa sand suggested in method C109-70T was employed.

On the 2-inch mortar cubes, the compressive strength shown in Table III indicate that cements of excellent high strength characteristics are produced.

TABLE III

| Ex. | Cement Composition Before Sand Addition | Water-Cement Ratio | Compressive Strength after Indicated Number of Days Aging - psi | | | Color |
|---|---|---|---|---|---|---|
| | | | 3 | 7 | 28 | |
| XVI | 80% rice hull ash of Ex XIV + 20% quicklime | 0.57 | 1500 | 3500 | 5130 | Black |
| XVII | 70% rice hull ash of Ex XIV + 30% Calaverous Brand Type III portland cement | 0.57 | 2390 | 3880 | 5140 | Black |
| XVIII | 75% rice hull ash of Ex XIV + 25% Santa Cruz Brand Type III portland cement | 0.53 | 2480 | 4180 | 5570 | Black |
| XIX | 70% rice hull ash of Ex XV + 30% Santa Cruz Brand Type III portland cement | 0.54 | 2580 | 5040 | 6500 | Grayish Black |
| Comparison | Min. ASTM requirements for general purpose portland cement (for reference purposes | 0.50 | 1200 | 2100 | 3500 | Gray |

EXAMPLE XX

A portion of rice hull ash from Example XIV was subjected to 1100° F for 66 hours under oxidizing conditions in an electric furnace. The resulting material showed only 0.30% loss of weight on ignition and had a surface area of 6.5 square meters per gram. The Silica activity index was still 50+ %. This relatively pure form of amorphous silica was further characterized by a refractive index of 1.43 and a density of about 2.0. This rice hull silica ash was compared in physical properties to other forms of silicon oxide and the results are indicated in Table IV.

TABLE IV

| | Density g/cc | Index of Refraction | Silica Activity Index, % |
|---|---|---|---|
| Quartz | 2.65 | 1.55 | 0.05 |
| Crystobalite | 2.32 | 1.48 | 4 |
| Obsidian | 2.25 | 1.47 | 4 |
| Rice Hull Ash (0.3% carbon) Ex. XX | 2.0 | 1.43 | 50 |
| Rice Hull Ash Ex. XIV | | | 53 |

EXAMPLE XXI

A small quantity of off-white, low loss-on-ignition amorphous silica ash prepared as in Example XX was ground in a laboratory mortar and pestle with 25% quicklime. The resulting cement was white in color and exhibited hardening characteristics when mixed with water.

Hydraulic cements exhibiting hardening characteristics may also be prepared by employing the novel siliceous ashes of this invention using from 5% to 50% by weight of lime and from 90% to 50% by weight of silica as the novel siliceous ashes of this invention (containing as noted above 49 to about 98% silica). The precise amount of lime and siliceous ash employed is dependent upon the character of the cement desired and the amount of silica in the siliceous ash. Thus for ashes having a relatively large residual carbon content, cements may be prepared with relatively low percentages of lime and the amount of lime may be increased as the percentage of silica in the siliceous ash increases.

Similarly, when employing the siliceous ash of this invention with portland cement, cements may be prepared varying slightly from the proportions indicated in Table III which nonetheless exhibit excellent compressive strengths.

Although the above examples indicate that the siliceous ash of this invention is ground with portland cement or quicklime to prepare the novel hydraulic cements of this invention, it is to be noted that grinding is not an absolute requirement for the preparation of the cement. Because there is a difference in density between the portland cement or lime and the siliceous ash of this invention, it is difficult to achieve uniform blending without a minimal amount of grinding and, therefore, minimal grinding of the materials to achieve blending is preferred. In addition, it is to be noted that the novel siliceous ash of this invention when not intimately mixed with the lime or portland cement has a tendency to absorb relatively large amounts of water. This water absorption is minimized by complete intimate mixing of the cement constituents before water addition and grinding is therefore preferred for that reason. One main purpose of minimal grinding is to break up the skeleton of the siliceous ash into relatively fine particles and therefore the novel siliceous ash of this invention may be separately ground and then intimately mixed with lime or portland cement. In general, grinding times of the lime or portland cement mixture may vary from about 15 minutes to about 2 hours and excellent compressive strength mortars are prepared from the resulting cement.

As noted above, the novel siliceous ashes of this invention are anhydrous when prepared. This has been demonstrated by conducting certain loss-on-ignition determinations referred to above under conditions of thermal gravimetric analysis. That is, the loss-on-ignition studies have been conducted while continuously weighing the sample. It was noted that all weight loss occurred at temperatures which indicated removal of residual carbon rather than removal of any hydrated material remaining after initial preparation of the ash.

EXAMPLE XXII

To demonstrate the high acid resistance of the cement and mortar prepared from the siliceous ashes of this invention, mortar cubes from Examples XVI, XVII and XVIII, after seven days of curing, were immersed in a 1% solution of hydrochloric acid. In addition, as a control, a typical ASTM Type I portland cement mortar cube was also subjected to the same test. At the end of 30 days, the cubes from Examples XVI, XVII and XVIII showed no surface softening or etching while the Type I mortar cube showed evidence of acid deterioration by way of softening and etching.

It is to be understood that the compositions of this invention are applicable to the preparation of both mortar and concrete. Generally speaking, mortar contains from about 2 to about 6 times of sand by weight of hydraulic cement (anhydrous) employed. Generally speaking, in preparation of mortar, sufficient water is added to the sand cement mixture to make it workable and flowable. As a broad generalization, approximately ½ the amount by weight of water, based on the amount of cement employed, is added to the mixture, but from about 0.5 to about 0.6 times water by weight of cement may be employed.

As is well known in the art, concrete is prepared from a hydraulic cement using both sand and rock as a filler material. From 2 to 3 times sand by weight of cement, and from 3 to 4 times rock by weight of cement may be employed in the preparation of concrete; using water to the desired consistency.

EXAMPLE XXIII

A cement was prepared using the novel siliceous ash of this invention prepared in Example XIV, by grinding a measured portion of the ash with 25% by weight of calcium hydroxide (hydrated lime — $Ca(OH)_2$) for approximately 2 hours. Mortar cubes were prepared by following ASTM method C109-70T as described above. The standard amount of Ottawa sand called for by the method and a water to cement ratio of 0.5 were employed. The resulting mortar cubes, after curing as called for by the ASTM method, had compressive strengths as follows: after 3 days, 1100 psi; after 7 days, 2840 psi; and after 28 days, 4160 psi.

When using the novel siliceous ashes of this invention with either quicklime or hydrated lime to form hydraulic cement or mortar, it is preferred to use from 20 to 40% by weight of lime in the lime-siliceous ash mixture, as excellent results are achieved in this range.

EXAMPLE XXIV

Again employing the siliceous ash from Example XIV, a hydraulic cement was prepared by first grinding the ash in a ball mill for 15 minutes and subsequently blending the ground ash with 20% by weight of calcium oxide for 15 minutes to achieve a homogeneous mixture. Following the method of ASTM C109-70T, mortar cubes were prepared and cured. In the preparation of the mortar cubes, the water to cement ratio was 0.65. The 7-day compression strength tests indicated that the cubes had a compressive strength of 860 psi while the 28-day test indicated compressive strengths of 1550 psi.

EXAMPLE XXV

The procedure of Example XXIV was repeated using 30% calcium oxide instead of 20% by weight of calcium oxide. In preparing the mortar, the water to cement ratio was 0.70 and compressive strengths of 1210 psi and 2170 psi for 7 and 28 days, respectively, were achieved.

In addition to the preparation of hydraulic cements, the novel siliceous ashes of this invention may be employed as a base for catalysts and other active chemical agents where a siliceous material of relatively high surface area is useful. In addition, the siliceous ashes of this invention also find utility as fillers for plastic materials and such materials as natural and synthetic rubber, as well as other uses which depend upon having a silica of high reactivity and relatively high surface area.

I claim:

1. A relatively anhydrous composition comprising from 10 – 50% by weight of portland cement, said portland cement having from about 60 to 69% by weight of combined and uncombined CaO; and from about 32 to about 90% by weight of $SiO_2$ in the form of a highly reactive, amorphous anhydrous silica material derived from organic agricultural matter, having an initial silica content expressed as $SiO_2$ of up to about 28%, said silica material comprising from about 49 to about 98% $SiO_2$, characterized by complete absence of crystalline silica as determined by x-ray diffraction analysis; balance being minor impurities and residual carbon, said carbon removable upon prolonged heating to give a composition containing from about 0.3 to about 2% residual carbon, and from 1.0 to about 5% minor impurities, other than CaO.

* * * * *